E. SCHMIDT.
BAKING OVEN.
APPLICATION FILED JUNE 8, 1908.
917,160.
Patented Apr. 6, 1909.
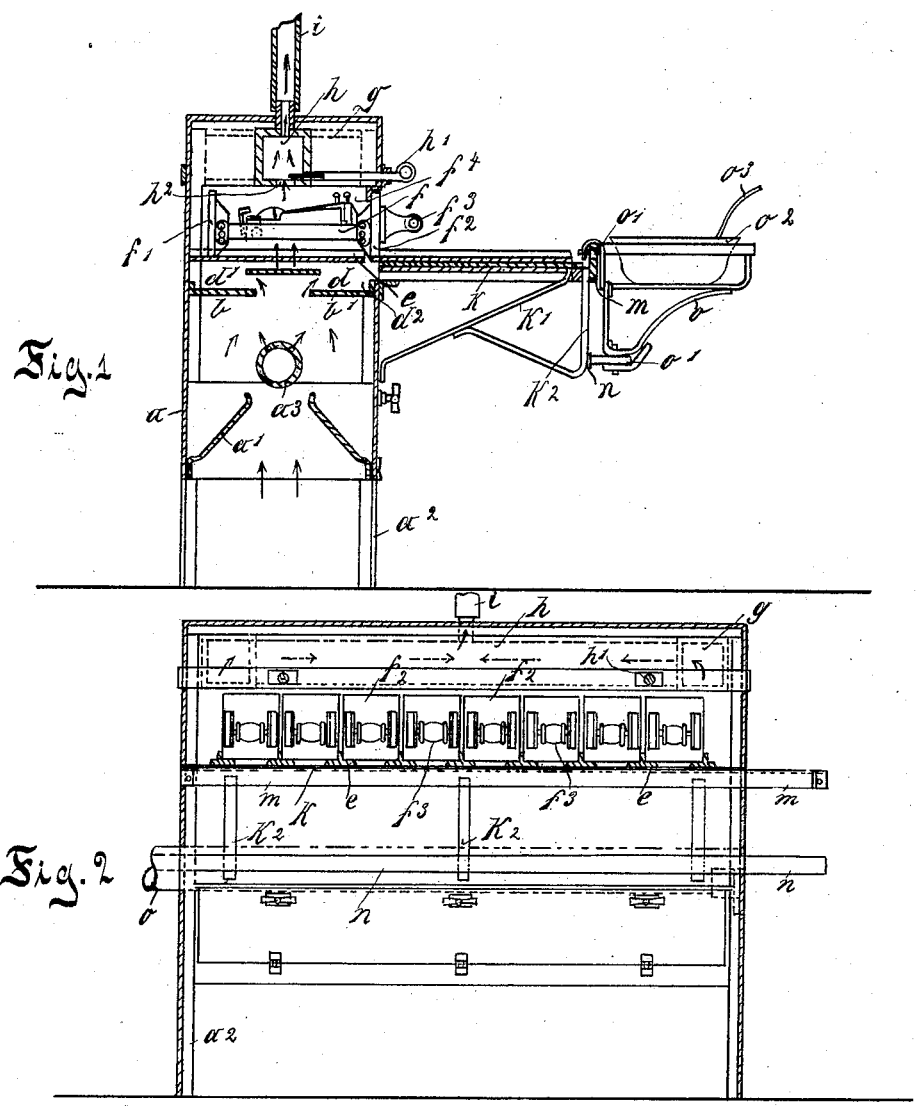

UNITED STATES PATENT OFFICE.

EMIL SCHMIDT, OF BARMEN, GERMANY.

BAKING-OVEN.

No. 917,160.  Specification of Letters Patent.  Patented April 6, 1909.

Application filed June 8, 1908. Serial No. 437,439.

*To all whom it may concern:*

Be it known that I, EMIL SCHMIDT, residing in the city of Barmen, Rhenish Prussia, Germany, a subject of the Emperor of Germany, have invented a new and useful Improvement in Baking-Ovens, of which the following is a specification.

My invention has reference to baking ovens and has for its object an oven adapted to receive a number of baking forms each constructed according to the special shape of the baked article desired.

The invention lies in a construction and combination of parts which render the oven very effective and simple in its operation.

On the accompanying drawings the baking oven is shown in Figure 1 in a vertical section and in Fig. 2 in a front view.

By $a$ is marked the casing of the oven which is constructed of sheet metal in a rectangular form as shown and which in the present example is also arranged to be heated with gas. In the interior of the oven are fastened in the lower portion two plates $a^1$ inclined against each other so as to form a channel $a^3$ for admittance of air and over said channel is arranged the gas leading pipe $o$ being at the same time constructed as a burner in order to issue the heating flames as shown. Over said pipe there are two horizontal plates $b$, $b^1$ fastened to the walls which form a passage $b^2$ and over this passage is placed a horizontal plate $d$ leaving right and left side passages $d^1$, $d^2$. In the top portion of the oven and above the said plate $d$ there are fitted a number of fixed rails $e$ of T-section which serve as support for a number of carriages $f$ of any suitable construction and having a back plate $f^1$ and a front plate $f^2$ which close the opening $f^4$ cut in the front of the oven wall for the passage of the carriages $f$. Over said carriages there is formed within the fire proof bricks $g$ a channel $h$ that is open at both ends to receive the fire gases and is provided with a chimney pipe $i$ to carry said gases away. A drawer $h^1$ in combination with an opening $h^2$ in the channel serves to regulate the issue of the gases. The oven is fitted with legs $a^2$.

In front of the oven there is arranged a table $k$ on which extend the rails $e$ so that each carriage $f$ may travel over the table in order to receive a baking form which thus is outside the oven and can be operated and filled with dough and after this operation may be shifted back into the oven by means of the carriage. When drawn out of the oven the plate $f^1$ of the carriage closes the opening $f^4$. In order to move the carriages with convenience each of them is provided with a convenient handle $f^3$. The table $k$ carries by means of suitable supports $k^1$ and $k^2$ the rails $m$ and $n$ and on these rails a carriage $o$ fitted with rollers $o^1$ may travel to and fro. Said carriage may be of any suitable construction and is employed to hold a cup shaped receptacle $o^2$ for dough which has a spoon $o^3$ in order to conveniently fill in the dough into the drawn out forms and as will be easily understood the improved oven is very simple in construction and also in operation, each carriage has only to be moved out and in and dough filled into the form $c$ which is taken from the traveling receptacle $o^2$.

What I claim and desire to secure by Letters Patent is:

A baking oven comprising a front wall having openings therein, a plurality of carriages fitting said openings and adapted to be drawn in and out, baking forms removably held in said carriages, a table supporting said carriages and a dough receptacle adapted to be moved along said table.

EMIL SCHMIDT. [L. S.]

Witnesses:
 OTTO KÖNIG,
 WM. WASHINGTON BRUNSWICK.